US009483379B2

(12) United States Patent
Greathouse et al.

(10) Patent No.: US 9,483,379 B2
(45) Date of Patent: Nov. 1, 2016

(54) RANDOMLY BRANCHING USING HARDWARE WATCHPOINTS

(71) Applicant: Advanced Micro Devices, Inc., Sunnyvale, CA (US)

(72) Inventors: Joseph L. Greathouse, Austin, TX (US); David S. Christie, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 347 days.

(21) Appl. No.: 14/054,356

(22) Filed: Oct. 15, 2013

(65) Prior Publication Data

US 2015/0106602 A1  Apr. 16, 2015

(51) Int. Cl.
*G06F 9/38* (2006.01)
*G06F 11/36* (2006.01)
*G06F 11/30* (2006.01)
*G06F 11/34* (2006.01)

(52) U.S. Cl.
CPC ........... *G06F 11/36* (2013.01); *G06F 11/3065* (2013.01); *G06F 11/3072* (2013.01); *G06F 11/3093* (2013.01); *G06F 11/3466* (2013.01); *G06F 11/3471* (2013.01); *G06F 11/3476* (2013.01); *G06F 11/3495* (2013.01); *G06F 2201/81* (2013.01); *G06F 2201/865* (2013.01); *G06F 2201/88* (2013.01)

(58) Field of Classification Search
None
See application file for complete search history.

(56) References Cited

U.S. PATENT DOCUMENTS

| 5,764,885 | A | * | 6/1998 | Sites | G06F 11/3636 712/201 |
| 5,802,272 | A | * | 9/1998 | Sites | G06F 11/3466 714/45 |
| 5,909,578 | A | * | 6/1999 | Buzbee | G06F 11/3466 714/E11.2 |
| 5,913,043 | A | | 6/1999 | Carter et al. | |
| 5,944,841 | A | * | 8/1999 | Christie | G06F 11/3466 714/38.11 |

(Continued)

OTHER PUBLICATIONS

'Modern Microprocessors—A 90 Minute Guide!' by Jason Robert Carey Patterson, last updated Aug. 2012.*

(Continued)

*Primary Examiner* — Steven Snyder
(74) *Attorney, Agent, or Firm* — Rory D. Rankin; Meyertons, Hood, Kivlin, Kowert & Goetzel, P.C.

(57) ABSTRACT

A system and method for efficiently performing program instrumentation. A processor processes instructions stored in a memory. The processor allocates a memory region for the purpose of creating "random branches" in the computer code utilizing existing memory access instructions. When the processor processes a given instruction, the processor both accesses a first location in the memory region and may determine a condition is satisfied. In response, the processor generates an interrupt. The corresponding interrupt handler may transfer control flow from the computer program to instrumentation code. The condition may include a pointer storing an address pointing to locations within the memory region equals a given address after the point is updated. Alternatively, the condition may include an updated data value stored in a location pointed to by the given address equals a threshold value.

20 Claims, 4 Drawing Sheets

(56) References Cited

U.S. PATENT DOCUMENTS

| | | | | |
|---|---|---|---|---|
| 5,953,530 | A * | 9/1999 | Rishi | G06F 11/3636 714/38.13 |
| 6,016,466 | A * | 1/2000 | Guinther | G06F 11/3419 702/186 |
| 6,186,677 | B1 * | 2/2001 | Angel | G06F 11/3624 714/35 |
| 6,205,545 | B1 * | 3/2001 | Shah | G06F 9/3802 712/237 |
| 6,233,531 | B1 | 5/2001 | Klassen et al. | |
| 6,314,558 | B1 * | 11/2001 | Angel | G06F 11/3612 714/35 |
| 6,643,842 | B2 * | 11/2003 | Angel | G06F 11/3612 714/35 |
| 6,721,941 | B1 * | 4/2004 | Morshed | G06F 11/3612 709/217 |
| 6,728,949 | B1 * | 4/2004 | Bryant | G06F 11/3409 712/233 |
| 6,760,903 | B1 * | 7/2004 | Morshed | G06F 11/3466 717/130 |
| 7,240,335 | B2 * | 7/2007 | Angel | G06F 11/3612 714/E11.209 |
| 7,526,757 | B2 * | 4/2009 | Levine | G06F 11/3636 717/127 |
| 7,698,692 | B1 * | 4/2010 | Garud | G06F 11/3466 714/38.14 |
| 7,814,466 | B2 * | 10/2010 | Chen | G06F 11/3466 712/227 |
| 7,890,941 | B1 * | 2/2011 | Garud | G06F 8/443 712/228 |
| 7,987,453 | B2 * | 7/2011 | DeWitt, Jr. | G06F 11/3409 712/227 |
| 8,051,332 | B2 * | 11/2011 | Zakonov | G06F 11/3409 714/38.1 |
| 8,245,199 | B2 * | 8/2012 | Chen | G06F 11/3466 717/130 |
| 8,479,052 | B2 * | 7/2013 | Zakonov | G06F 11/3409 714/38.1 |
| 8,615,742 | B2 * | 12/2013 | Indukuru | G06F 8/4442 717/124 |
| 8,832,666 | B2 * | 9/2014 | Singh | G06F 11/3471 717/130 |
| 8,839,041 | B2 * | 9/2014 | Zakonov | G06F 11/3409 714/38.1 |
| 2001/0047510 | A1 * | 11/2001 | Angel | G06F 11/3612 717/128 |
| 2002/0095661 | A1 * | 7/2002 | Angel | G06F 11/3612 717/130 |
| 2004/0133882 | A1 * | 7/2004 | Angel | G06F 11/3612 717/130 |
| 2005/0155019 | A1 * | 7/2005 | Levine | G06F 11/3636 717/127 |
| 2005/0210454 | A1 * | 9/2005 | DeWitt, Jr. | G06F 11/3409 717/133 |
| 2007/0079294 | A1 * | 4/2007 | Knight | G06F 9/30003 717/130 |
| 2007/0226703 | A1 * | 9/2007 | Sharapov | G06F 12/0862 717/131 |
| 2007/0260849 | A1 * | 11/2007 | Chen | G06F 9/5044 712/34 |
| 2007/0260860 | A1 * | 11/2007 | Chen | G06F 11/3466 712/227 |
| 2007/0261033 | A1 * | 11/2007 | Chen | G06F 11/3466 717/130 |
| 2007/0261034 | A1 * | 11/2007 | Chen | G06F 11/3466 717/130 |
| 2008/0082969 | A1 * | 4/2008 | Agha | G06F 11/3684 717/130 |
| 2010/0037101 | A1 * | 2/2010 | Zakonov | G06F 11/3409 714/38.1 |
| 2011/0154297 | A1 * | 6/2011 | Singh | G06F 11/3471 717/130 |
| 2012/0011491 | A1 * | 1/2012 | Eldar | G06F 11/3612 717/130 |
| 2012/0084537 | A1 * | 4/2012 | Indukuru | G06F 12/0862 712/227 |
| 2013/0247008 | A1 * | 9/2013 | Mitran | G06F 9/30058 717/130 |
| 2014/0325193 | A1 * | 10/2014 | Singh | G06F 11/3471 712/228 |

OTHER PUBLICATIONS

Drongowski, Paul J., "Instruction-Based Sampling: A New Performance Analysis Technique for AMD Family 10h Processors", Advanced Micro Devices, Inc., Nov. 16, 2007, 14 pages.

Lee, et al., "Branch-on-Random", Proceedings of the 6th Annual IEEE/ACM International Symposium on Code Generation and Optimization, Apr. 5-10, 2008, 10 pages, ACM, New York, NY, USA.

Dean, et al., "ProfileMe: Hardware Support for Instruction-Level Profiling on Out-of-Order Processors", MICRO 30 Proceedings of the 30th Annual ACM/IEEE International Symposium on Microarchitecture, Dec. 1-3, 1997, 12 pages, IEEE Computer Society, Washington, DC, USA.

* cited by examiner

RANDOMLY BRANCHING USING HARDWARE WATCHPOINTS

BACKGROUND

1. Field of the Invention

This invention relates to high performance computing systems, and more particularly, to efficiently performing program instrumentation.

2. Background

An understanding of the dynamic behavior of software applications allows software programmers to write the applications in both an efficient and a high-performance manner. For this reason, software programmers at times add additional code to developing applications. The additional code may include instrumentation code and analysis code that communicates statistics and other information about the behavior of the application as it is processed. Patterns and particular events may be identified and characterized. However, as both the speed and the functionality of processors increase, it has become more difficult to collect information about the dynamic behavior of the applications.

The collection of information about application dynamic behavior may include a large number of trace instructions, a large amount of statistics, and an appreciable amount of overhead to perform the collection. The additional code may reduce the execution time of an application by an order of magnitude. A computer or server may run particular code for hours to test all major code paths. Straightforward instrumentation may increase the run time to days or even weeks.

Due to the problems identified above, the instrumentation and analysis code may be sampled to reduce the drawbacks of collecting dynamic behavior information. A relatively small percentage of the dynamically encountered instrumentation code is actually executed. The selection of when to execute the dynamically encountered instrumentation code may be performed in a random manner. Unfortunately, the selection process or performing the sampling decisions consumes an appreciable amount of time and cost.

Generating and comparing random numbers in software is non-trivial. Similarly, moving the sampling decisions to hardware consumes on-die real estate as circuitry is added to perform random number generation and connecting the results to other parts of the processor. Additionally, new instructions may be added to the instruction set architecture (ISA) to offer support, which is a non-trivial effort. Another approach may include using hardware to randomly tag an instruction and gather microarchitecture-level information about the processing of the tagged instruction. However, such an approach utilizes hard-coded analysis in the processor, rather than user-defined custom instrumentation code. Further, such an approach analyzes a single instruction versus multiple instructions of a software-based approach.

In view of the above, efficient methods and systems for efficiently performing program instrumentation are desired.

SUMMARY OF EMBODIMENTS

Systems and methods for efficiently performing program instrumentation are contemplated. In various embodiments, a computing system includes a memory for storing instructions of a computer program and a processor for processing the stored instructions. The processor allocates a memory region for the purpose of creating "random branches" in the computer code utilizing existing memory access instructions. When the processor processes a given instruction, the processor may both access a first location in the memory region and determine a condition is satisfied. In response, the processor may generate an interrupt. The corresponding interrupt handler may transfer control flow from the computer program to instrumentation code.

In some embodiments, the processor may include a watchpoint address register and a watchpoint data register, for example, among pre-existing debug registers already on the die. The processor may set a watchpoint address register to a first address pointing to a first location in the memory region. For example, the first pointed-to location may be the final location in the memory region. The processor may allocate a pointer that stores an address pointing to one of the multiple locations in the memory region. The processor may initialize the pointer to store a second address pointing to a second location of the multiple locations in the memory region. When the given instruction is executed, the pointer may be updated to store a third address pointing to a third location of the multiple locations in the memory region. In some embodiments, the processor may determine the condition is satisfied when the first address and the third address are the same. and generate the interrupt responsive to determining the first address and the third address are the same.

In other embodiments, in addition to setting the watchpoint address register, the processor may initialize each of a watchpoint data register and the first location in the memory region to store a threshold data value and a first data value, respectively. When the given instruction is executed, the first location may be updated to store a second data value. The processor may determine the condition is satisfied and generate the interrupt responsive to determining the second data value and the threshold data value are the same.

These and other embodiments will be further appreciated upon reference to the following description and drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENT(S)

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Figure 1:
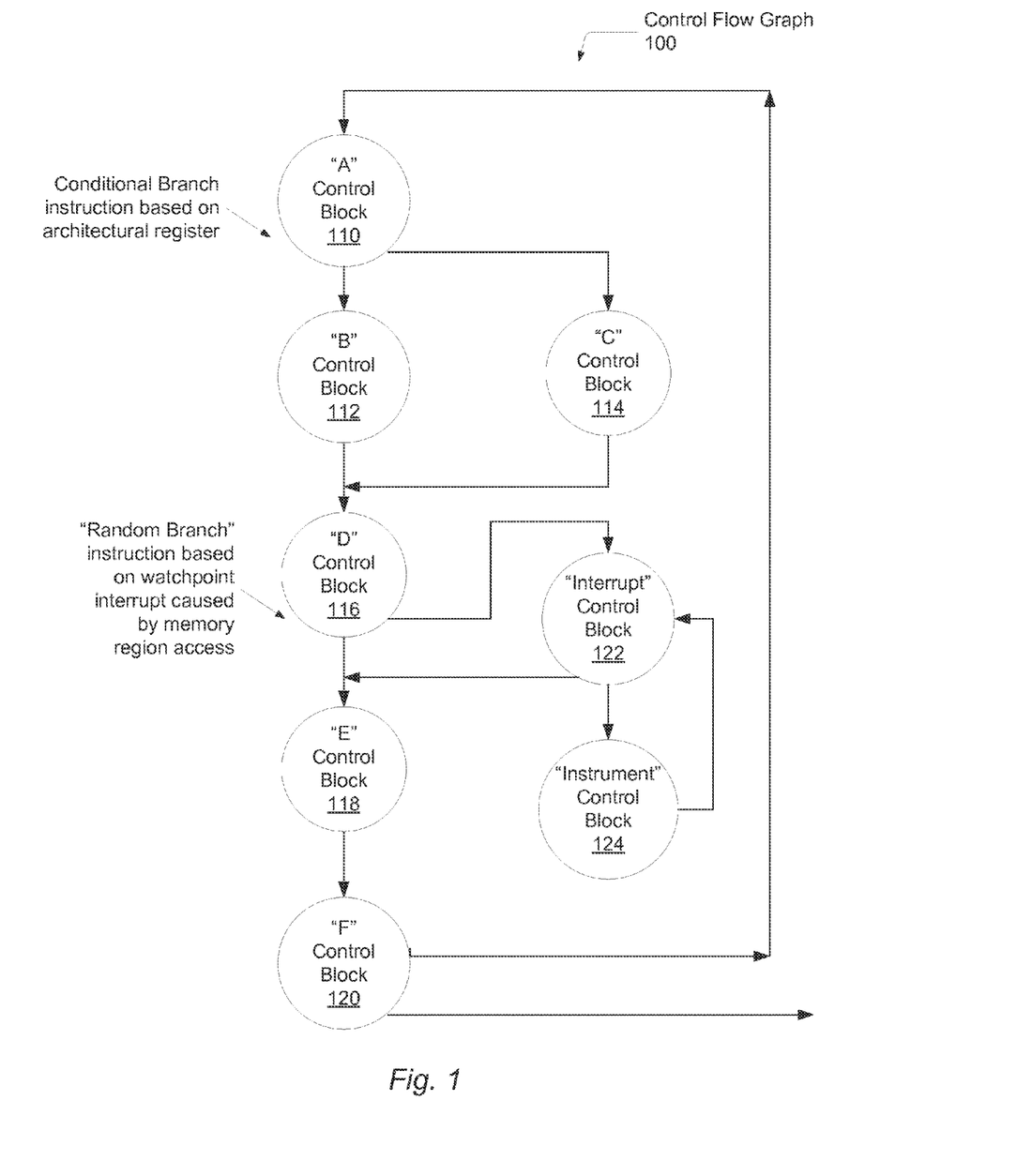
FIG. 1 is a generalized block diagram of one embodiment of a control flow graph.

Referring to FIG. 1, one embodiment of a control flow graph 100 is shown. Control blocks 110-124 represent control blocks within a software application or a subroutine. The arrows represent paths. The control flow graph 100 may represent a complete graph or a section of a larger control flow graph. Control block 110, or Block A for simpler demonstration, may represent an entry-point-control-block. Control block 122, or Block F for simpler demonstration, may represent an exit-point-control-block. Alternatively, Blocks A and F may connect to other control blocks not shown and the entry-point-control-block(s) and exit-point-control-block(s) are located elsewhere in a larger control flow graph.

The control blocks (CBs) A and D may represent multiple exit-point-control-blocks. For example, a path exiting CB A may go to CB B or go to CB C. A control flow instruction at the end of CB A may cause a path to CB B to be taken rather than a path to CB C. Alternatively, during another iteration, the control flow instruction at the end of CB A may cause a path to CB C to be taken rather than a path to CB B. Although not shown, the control flow graph (CFG) 100 may include multiple entry-point-control-blocks.

The control flow instruction at the end of CB A may be dependent on a value stored in a particular architectural register. An identifier of the particular architectural register may be specified in the instruction. The control flow instruction at the end of CB A may include one of a conditional branch instruction, an indirect jump instruction, and so forth.

Paths within the CFG 100 are listed in program sequence order. One path within the CFG 100 may be represented by control blocks (CBs) A, B, D, E and F. Here, the exit of CB A goes along the path to CB B. A second path may be represented by CBs A, C, D, E and F. Here, the exit of CB A goes along the path to CB C. A third path within the CFG 100 may be represented by CBs A, B, C, D, Interrupt, Instrument, Interrupt and F. Similar to CB A, the CB D has multiple exit points. For example, a path exiting CB D may go to CB E or go to CB Interrupt.

The occurrence of one or more given instructions at the end of CB D may cause a path to CB E to be taken rather than a path to CB Interrupt. Alternatively, during another loop iteration, the occurrence of the given one or more instructions at the end of CB D may cause a path to CB Interrupt to be taken rather than a path to CB E. Unlike the control flow instruction at the end of CB A, the given one or more instructions at the end of CB D may not be control flow instructions. The given one or more instructions at the end of CB D may not include a condition to test in order to cause a selection of a path in CFG 100 to take. Rather, the occurrence of the given one or more instructions may trigger the selection logic. When processed, the given one or more instructions may access and may update a location in a given memory region. The access or update of the memory region demarcated by a software programmer may cause watchpoint hardware to generate an interrupt.

The memory region and at least one corresponding pointer are allocated in the computer program. Examples of the given one or more instructions that may generate an interrupt include a pointer update instruction and a variable update instruction. In various embodiments, the update may be an increment operation. Watchpoint hardware may include debug registers, data address compare registers, data address breakpoint registers, and so forth. In some embodiments, a processor core may include watchpoint registers that store virtual memory addresses. Control logic associated with these watchpoint registers may be set to inspect or "watch" a number of bytes after a stored virtual address value. In some embodiments, the number of bytes may range between 1 and 8 bytes. If the control logic is enabled, then an interrupt may be generated responsive to determining a location matching a "watched" byte is read, written, or executed.

In some embodiments, the corresponding pointer may be initialized to a random location within the memory region. As used herein, "random" may refer to an output of a pseudorandom algorithm. A watchpoint may be set on a given address within the memory region. In some examples, the final address within the memory region may be selected for the watchpoint. A location within the computer program is selected to execute a random branch to other code, such as instrumentation code. At the selected location in the computer program, a set of instructions may be inserted that update the corresponding pointer and access a location in the memory region associated with the updated pointer. The update of the pointer may be an increment of the pointer.

If the updated pointer points to the watchpoint location, then the memory access causes the watchpoint hardware to generate an interrupt. The interrupt handler may reset the pointer to another random location within the memory region. The interrupt handler may transfer control flow from the computer program to other code, such as instrumentation code.

In other embodiments, an additional watchpoint may be set on a data value stored in a location pointed to by the watchpoint pointer. A watchpoint data register may store a watchpoint data value. Again, a location within the computer program is selected to execute a random branch to other code, such as instrumentation code. At the selected location in the computer program, a set of instructions may be inserted that update the corresponding pointer and access a location in the memory region associated with the updated pointer, wherein the access updates the data value stored in the location.

The update performed during the memory access may increment or decrement the stored data value. The updated data value may be compared to the stored watchpoint data value. If a match is found, the watchpoint hardware may generate an interrupt. The interrupt handler may reset the stored data value to a random value between zero and the stored watchpoint data value. In addition, the interrupt handler may reset the pointer to another random location within the memory region. Further, the interrupt handler may transfer control flow from the computer program to other code, such as instrumentation code.

During the generation of an interrupt in either of the two above cases, processing within a corresponding processor may be interrupted and control flow may be sent to the interrupt handler, which is represented as CB Interrupt in CFG 100. By setting an initial value stored in the pointer or the location pointed to by the pointer, it is possible to control how many events occur before a corresponding interrupt may be generated. Since the initial value may be a random number, the generation of the corresponding interrupt is randomized. The corresponding interrupt handler may transfer control flow of the processing of the program code to process other instructions rather than fall-through instructions in the program code. For example, the control flow may be transferred from CB D to CB Interrupt to CB Instrument, rather than from CB D to CB E. Therefore, a "random branch" is created at the location of the given instruction in the program code.

The change in the control flow causes the set of instructions at the selected location in the program code to behave as a "random branch". A software programmer may have placed the set of instructions at the end of CB D in order to create the "random branch". Therefore, the software programmer may predetermine particular interrupts may be taken at selected locations within the program code.

The code in the CB Instrument may include code to generate traces. In addition the instrumentation code in the CB Interrupt may monitor and collect information for a variety of multiple instruction types regarding branch prediction techniques, cache memory subsystem modeling, fault tolerance studies, memory access patterns and memory leaks, loop iterations, inter-procedural paths, and so forth. The instrumentation code collects information about a plurality of instructions in the computer program. When the instrumentation code completes, control flow may transfer back to the CB Interrupt. The interrupt handler may reset the pointer to the memory region and the data value stored in the location pointed to by the pointer to random values and transfer control back to the program code, such as to CB E.

Figure 2:
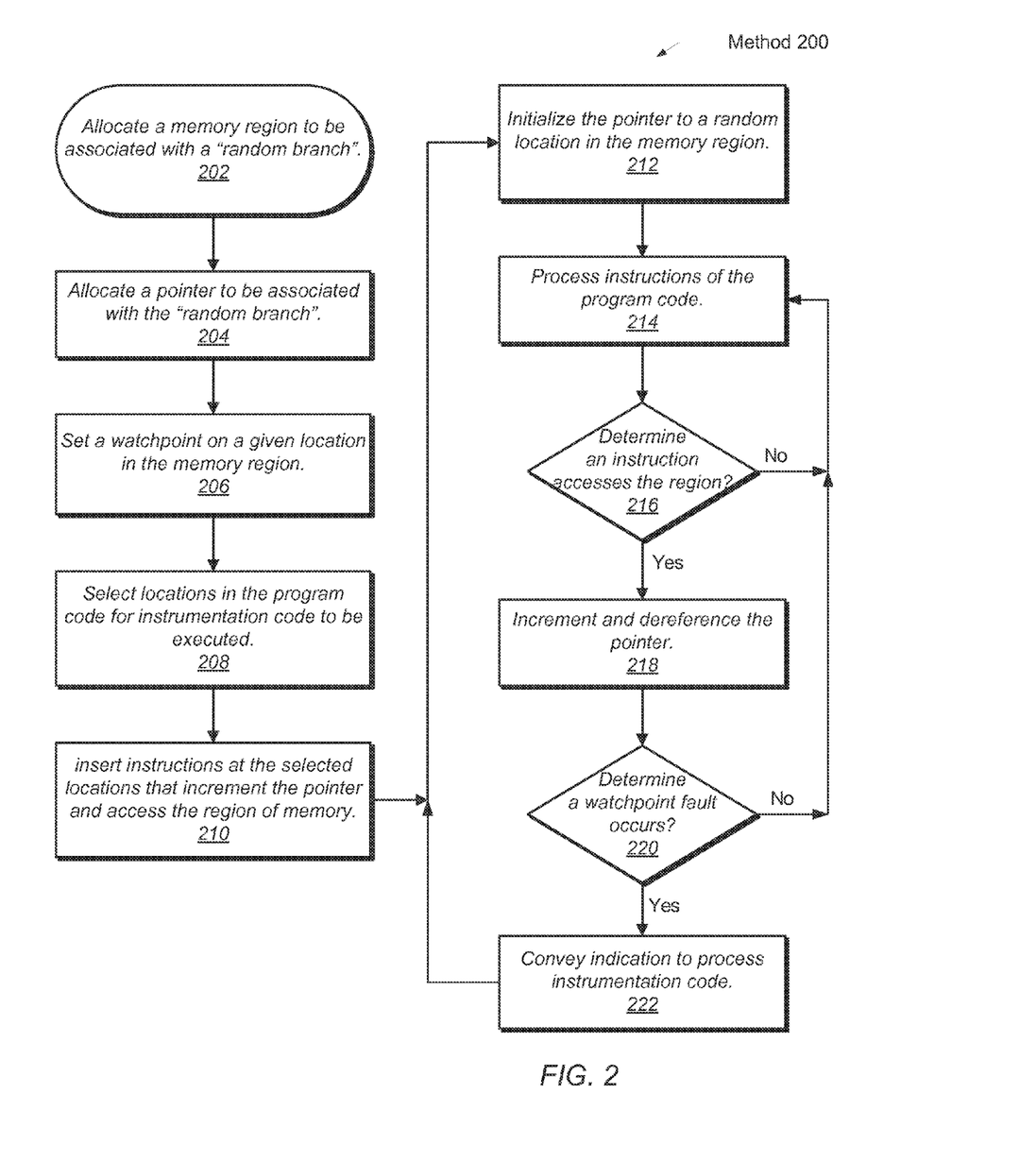
FIG. 2 is a generalized flow diagram of one embodiment of a method for efficiently performing program instrumentation.

Turning now to FIG. 2, one embodiment of a method 200 for efficient memory access instruction instrumentation is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 202, a memory region may be allocated for use in creating a random branch in a computer program. The memory region may be a contiguous region of memory. In block 204, a pointer to be associated with the "random branch" may be allocated. The pointer may be used to point to locations within the memory region. Additional pointers may be allocated to point to locations within the memory region. Each of the one or more pointers may be associated with a separate "random branch" in the computer program.

In block 206, a watchpoint may be set on an address pointing to a given location in the memory region. For example, a watchpoint address register may be loaded with a given address value. The final address may select as the watchpoint although other addresses and locations within the memory region may be selected. If multiple pointers are used to point to the memory region, then each of the multiple pointers may be compared to this watchpoint address. Further, the given address value stored in the watchpoint address register may have some bits of an address masked out or ignored. Therefore, a larger portion of the memory region may be "watched" or inspected, rather than a single location.

The larger portion being "watched" or inspected may include a set of size-aligned addresses. For example, the least-significant 12 bits of a value stored in the watchpoint address register may be zeroed or ignored. Now a given 4-kilobyte (KB) page within the memory region is being "watched" rather than a single location. Any touches (read, write, execution) of a location within the 4 KB page may cause a potential interrupt to be generated, rather than a touch of a single location.

In block 208, a software programmer may select a type of instrumentation and analysis to perform in instrumentation code and select the locations in the program code to perform the analysis and collection of information. In block 210, one or more instructions may be inserted in given locations in the program code for transferring control flow to other code to be executed other than the program code. The other code may be instrumentation code. The one or more instructions may be inserted in the program code at these selected locations. The one or more instructions inserted in the selected locations may update one of the one or more pointers pointing to a location within the memory region. The one or more instructions may also update a data value stored in the location pointed to by the updated pointer.

In block 212, each one of the one or more pointers may be initialized to a random location in the memory region. In block 214, the instructions in the program code are processed. The instructions may be fetched and decoded, source and destination registers may be renamed, and the instructions may be executed and retired. One or more processor cores may be used for processing the instructions of the program code.

If it is determined an instruction accesses the memory region (conditional block 216), then in block 218, a corresponding one of the one or more pointers may be updated and dereferenced. The update may include incrementing the corresponding pointer. The updated pointer may be compared to the value stored in the watchpoint address register. The comparison may occur for the entire value stored in the watchpoint address register. Alternatively, the comparison may occur for a portion of the value stored in the watchpoint address register in order to "watch" a larger portion of the memory region. The comparison may occur for the entire value stored in the watchpoint address register wherein a portion of the address is zeroed, such as a number of the least-significant bits of the address. A match may indicate a watchpoint fault occurs.

If it is determined a watchpoint fault occurs (conditional block 220), then in block then in block 222, an indication may be conveyed to process instrumentation code. For example, the interrupt handler may transfer control flow to user-defined custom instrumentation code. When the instrumentation and analysis code completes, control flow may return to the interrupt handler. The interrupt handler may reset the one or more pointers to store random values that point to other random locations within the memory region. Afterward, control flow may be transferred back to the program code at a location following the given one or more instructions that update a pointer and access the memory region.

Figure 3:
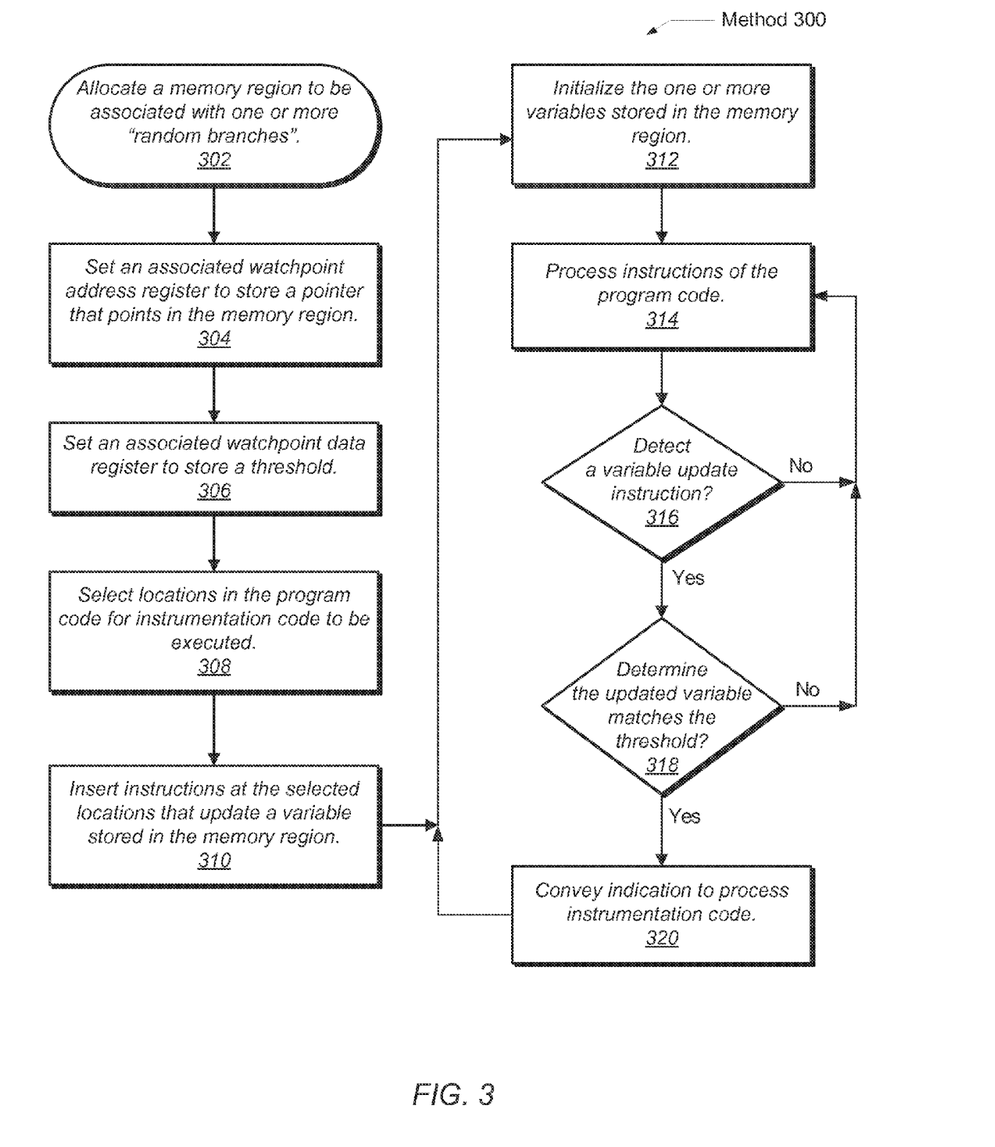
FIG. 3 is a generalized flow diagram of another embodiment of a method for efficiently performing program instrumentation.

Turning now to FIG. 3, another embodiment of a method 300 for efficient memory access instruction instrumentation is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 302, a memory region may be allocated for use in creating a "random branch" in a computer program. The memory region may be a contiguous region of memory. A pointer to be associated with a given "random branch" may be allocated. The pointer may be used to point to locations within the memory region. The given location may store a value for a variable. In some embodiments, multiple pointers may be allocated to point to multiple locations within the memory region.

In block 304, a watchpoint address register may be loaded with a pointer value that points to one or more locations within the memory region. In some embodiments, the full watchpoint address register is used and the stored pointer value points to a single memory location within the memory region. In other embodiments, one or more least-significant bits of the watchpoint address register may be masked or ignored. Accordingly, the stored pointer value may point to a portion of the memory region larger than a single memory location. For example, the least significant 12 bits of the watchpoint address register may be ignored or masked with zeroes. In this example, the masked pointer value now points to a 4 KB page within the memory region.

Continuing with the above example, if each variable is 8 bytes, then the 4 KB page within the memory region stores 512 variables. Each of the 512 variables may be used for a separate "random branch". As described shortly, a software programmer may utilize 512 different "random branch" instructions in the computer program. Each one of the "random branch" instructions may update a respective one of the 512 variables in the 4 KB page within the memory region. Similarly, if each variable is 4 bytes, then the 4 KB page within the memory region stores 1,024 variables, each variable being used for a separate "random branch". Each variable may be initialized to a different random value and may be updated independently.

In block 306, a watchpoint data register may be loaded with a threshold value. The threshold may be compared to a variable stored in the memory region when the memory region is accessed. In some embodiments, a variable stored in a memory location pointed to by the watchpoint address register is initialized to zero and the threshold stored in the watchpoint data register is initialized to a random value. The variable may be updated, such as incremented, by an instruction located at a "random branch" location in the computer program. When the updated variable matches the threshold, an interrupt may be generated. Therefore, the variable may be updated a random number of times during program execution before the interrupt is generated.

If multiple variables are used, such as 512 variables in a 4 KB page as described in an earlier example, then each of the multiple variables may be initialized to zero. The probability of taking a "random branch" may be equal for each of the multiple variables, since the watchpoint data register is used for comparisons for each of the multiple variables. Alternatively, each of the multiple variables may be initialized to a different respective random value. Now, each of the multiple variables has a different probability of taking a "random branch" during program execution.

In block 308, a software programmer may select a type of instrumentation and analysis to perform in instrumentation code and select the locations in the program code to perform the analysis and collection of information. In block 310, one or more instructions may be inserted in given locations in the program code for transferring control flow to other code to be executed other than the program code. The other code may be instrumentation code. The one or more instructions may be inserted in the program code at these selected locations. The one or more instructions inserted in the selected locations may update one or more variables. In addition, the one or more instructions may perform any necessary saves and restores of architected registers that are overwritten by the one or more instructions updating variables. The variables may be pointed to by a full value or a masked value stored in the watchpoint address register.

In block 312, each of the one or more variables pointed to by a full value or a masked value stored in the watchpoint address register is initialized. As described earlier, each of the one or more variables may be initialized to zero. Alternatively, the one or variables may be initialized to a random value by a random generation function. In block 314, the instructions in the program code are processed. The instructions may be fetched and decoded, source and destination registers may be renamed, and the instructions may be executed and retired. One or more processor cores may be used for processing the instructions of the program code.

One or more memory locations within the allocated memory region may be "watched" by comparing pointer values to the watchpoint address register or a masked version of the value stored in the watchpoint address register. If it is determined an instruction updates a variable stored in a "watched" memory location in the memory region (conditional block 316), then the updated variable may be compared to the threshold stored in the watchpoint data register.

If the updated variable matches the threshold (conditional block 318), then in block 320, an indication may be conveyed to process instrumentation code. For example, the interrupt handler may transfer control flow to user-defined custom instrumentation code. When the instrumentation and analysis code completes, control flow may return to the interrupt handler. The interrupt handler may reset the one or more pointers to store random values that point to other random locations within the memory region. Afterward, control flow may be transferred back to the program code at a location following the given one or more instructions that update a pointer and access the memory region.

Figure 4:
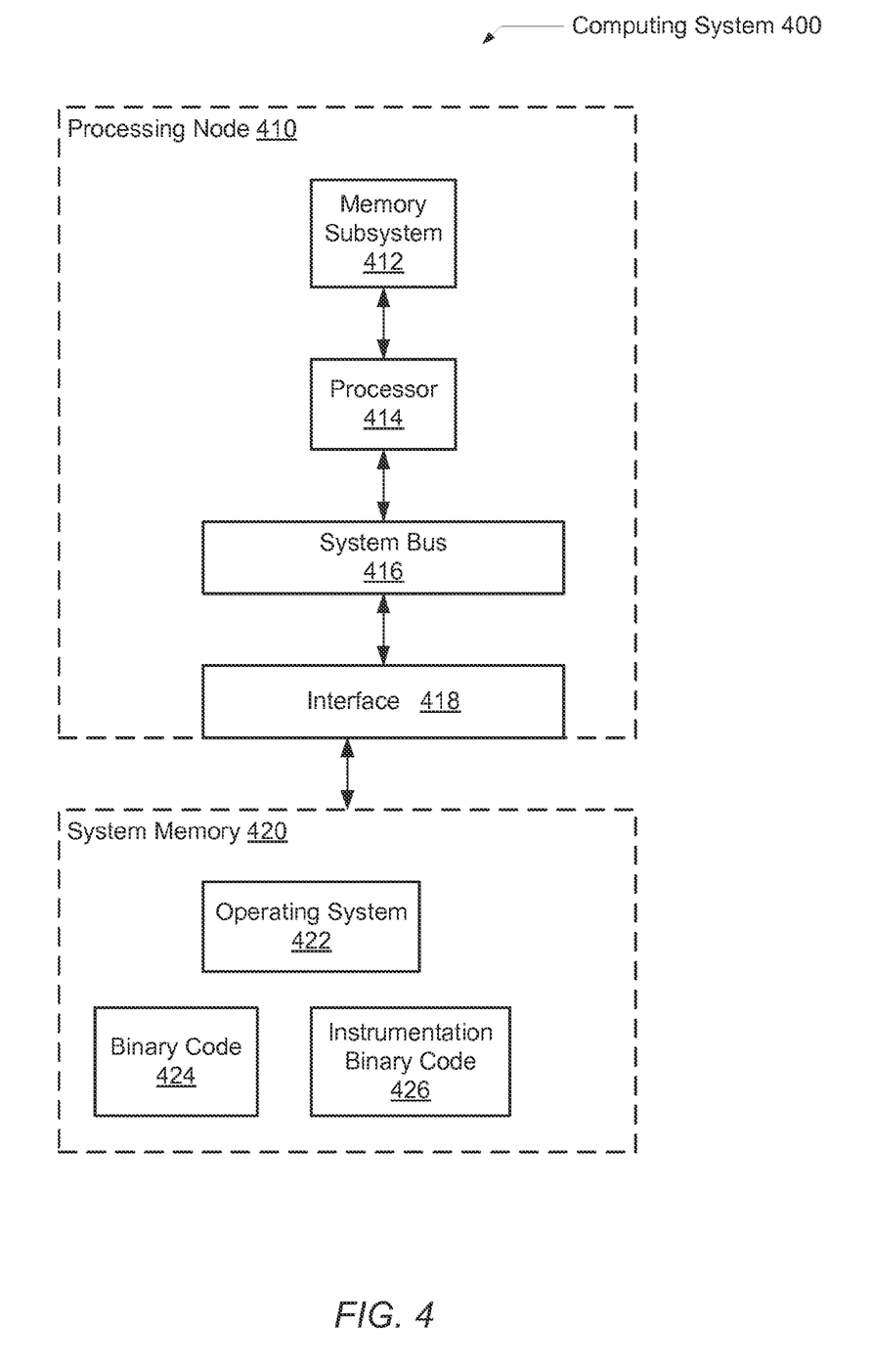
FIG. 4 is a generalized block diagram of one embodiment of a computing system.

Turning now to FIG. 4, a generalized block diagram illustrating one embodiment of a computing system 400 is shown. As shown, the computing system 400 includes processing node 410 and system memory 420. In various embodiments, the processing node 410 includes a system bus 416, a processor 414, and a memory subsystem 412. Additionally, the processing node 410 may include the interface 418 for connecting to input/output (I/O) peripheral devices, to the system memory 420 and to other systems. Although a single processor 414 is shown, the processing node 410 may include multiple processors, each with one or more processor cores. The multiple processors may be homogenous or heterogeneous microarchitecture designs.

The system memory 420 may include at least an operating system (OS) 422, binary code 424 corresponding to a software application, and instrumentation binary code 426. The OS 422 may generally manage the operation of the hardware in the processing node 410, which relieves application programs from having to manage details such as allocating regions of memory for a software application. The multiple processes of a compiled software application may require its own resources such as an image of memory, or an instance of instructions and data before application execution. Each process may comprise process-specific information such as address space that addresses the code, data, and possibly a heap and a stack; variables in data and control registers such as stack pointers, general and floating-point registers, program counter, and otherwise; and operating system descriptors such as stdin, stdout, and otherwise, and security attributes such as processor owner and the process' set of permissions.

The binary code 424 may include compiled instructions of a software application developed by a software programmer. Additionally, the instrumentation binary code 426 may include compiled instructions of instrumentation code developed by the software programmer. Copies of portions of both the binary code 424 and the instrumentation binary code 426 may also be stored in one or more levels of a cache subsystem within the memory subsystem 412.

The binary instrumentation of code may be performed statically or dynamically. For either manner, both data flow and control flow analyses are performed to yield a data flow graph and a control flow graph, respectively. For dynamic instrumentation, the loading and executing of object code and instrumentation object code may occur in response to generated interrupts. The interrupts may be generated based on a comparison of an updated variable to a given threshold where matches occur randomly. Instrumentation libraries and tools may be used to create the instrumentation binary code 426.

The instrumentation binary code 426 may be used to provide statistics for performance studies or debugging techniques. When control flow is transferred from the software application algorithm used in the binary code 424 to the algorithms in the instrumentation binary code 426, program characteristic information may be relayed by the analysis routines to other software analysis units, which may determine errors and performance during execution. Alternatively, the program characteristic information is conveyed to storage for later analysis and inspection.

The processing node 410 may include one of various computing products such as a desktop computer, a server, a tablet computer, a laptop computer, and so forth. For ease of illustration, the computing system 400 does not include all examples of functional blocks, control logic, and interfaces required both within and outside the computer system 110.

In various embodiments, the illustrated functionality of the processing node 410 is incorporated upon a single integrated circuit. In other embodiments, the illustrated functionality of the processing node 410 may be provided on a system-on-chip (SOC), on separate semiconductor chips on a motherboard or card, or other. Although a single processor 414 is shown, the processing node 410 may include multiple processors. The other processors may include a graphics processing unit (GPU), another type of single-instruction-multiple-data (SIMD) core, a digital signal processor (DSP), an application-specific integrated circuit (ASIC), other general-purpose processors, and so forth. The processor 414 may include multiple processor cores. Each processor core may include circuitry for executing instructions according to a predefined instruction set. For example, the x86® instruction set architecture (ISA) may be selected. Alternatively, the x86-64®, Alpha®, PowerPC®, MIPS®, SPARC®, PA-RISC®, or any other instruction set architecture may be selected.

Generally speaking, the processor 414 accesses memory storage for data and instructions or commands. In some embodiments, a cache memory subsystem implemented as a L1 cache structure configured to store blocks of data, and possibly with an additional L2 cache structure, is integrated within the processor 414. Memory subsystem 412 may be implemented as a L2 or L3 cache structure and may be directly coupled to the processor 414. If a requested block is not found in an integrated cache structure or memory subsystem 412, then a read request may be generated and transmitted to a memory controller in order to access outside memory to which the missing block is mapped. The functionality of a memory controller may be included in the interface 418.

The interface 418 may follow memory channel protocols for determining values used for information transfer, such as a number of data transfers per clock cycle, signal voltage levels, signal timings, signal and clock phases and clock frequencies. Additionally, the interface 418 may include request queues for queuing memory requests. The off-die memory may include one of multiple types of dynamic random access memories (DRAMs). The DRAM may be further connected to lower levels of a memory hierarchy, such as system memory 420, which may be a disk memory.

Any integrated memory within the processor 414, the memory subsystem 412, and any off-die memory may comprise any suitable memory devices in addition to a cache structure. For example, these memories may comprise one or more RAMBUS dynamic random access memories (DRAMs), synchronous DRAMs (SDRAMs), DRAM, static RAM, sequential storage elements such as flip-flops and latches, etc.

The system bus 416 may be configured to respond to control packets received on links to which the processing node 410 is coupled, to generate control packets in response to the processor 414 and/or memory subsystems 412, to generate probe commands and response packets in response to transactions selected by a memory controller not shown, and to route packets through interface logic 418. The interface (IF) 418 may include logic to receive packets and synchronize the packets to an internal clock used by system bus 416. The interface 418 may include buffers and queues for storing packets to be processed or transmitted. The computer system 400 may employ any suitable flow control mechanism for transmitting data.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   a memory configured to store a computer program;
   a processor coupled to the memory, wherein the processor is configured to:
     process instructions of the stored computer program;
     allocate in the memory a memory region comprising a plurality of locations;
     store a first address in a watchpoint address register, wherein the first address identifies a given location of the plurality of locations;
     initialize a pointer with a second address that identifies a random location of the plurality of locations; and
     responsive to determining a predetermined instruction is being processed:
       compare the first address to the second address; and
       forego processing of instructions following the predetermined instruction and process instrumentation code, in further response to determining the first address matches the second address.

2. The computing system as recited in claim 1, wherein in further response to determining the predetermined instruction is being processed and the first address does not match the second address, the processor is further configured to process an instruction following the predetermined instruction in program order without processing the instrumentation code.

3. The computing system as recited in claim 1, wherein the processor is further configured to update the second address with a new address that identifies a new location of the plurality of locations.

4. The computing system as recited in claim 3, wherein the processor is configured to update the second address by either incrementing the second address or decrementing the second address.

5. The computing system as recited in claim 1, wherein to forego processing of instructions following the predetermined instruction and process the instrumentation code, the processor is further configured to transfer control flow from the computer program to the instrumentation code.

6. The computing system as recited in claim 1, wherein in response to detecting execution of the instrumentation code has completed, the processor is further configured to:
   update the second address with a new address that identifies a random location of the plurality of locations; and
   transfer control flow from the instrumentation code to instructions following the predetermined instruction in the computer program.

7. The computing system as recited in claim 2, wherein the processor is further configured to:
   initialize a watchpoint data register to store a threshold data value; and
   initialize a first data value stored in the given location identified by the first address to store a random number between zero and the threshold data value.

8. The computing system as recited in claim 7, wherein the processor is further configured to:
   compare the threshold data value to the first data value responsive to determining the first address matches the second address; and
   forego processing of instructions following the predetermined instruction and process the instrumentation code in response to determining the first data value matches the threshold data value.

9. The computing system as recited in claim 8, wherein in response to determining the first data value does not match the threshold data value, the processor is further configured to process an instruction following the predetermined instruction in program order without processing the instrumentation code.

10. A method executable by at least one processor in a computing system, the method comprising:
    processing instructions of a computer program stored in a memory;
    allocating in the memory a memory region comprising a plurality of locations;
    storing a first address in a watchpoint address register, wherein the first address identifies a given location of the plurality of locations;
    initializing a pointer with a second address that identifies a random location of the plurality of locations; and
    responsive to determining a predetermined instruction is being processed:
      comparing the first address to the second address; and
      foregoing processing of instructions following the predetermined instruction and processing instrumentation code, in response to determining the first address matches the second address.

11. The method as recited in claim 10, wherein in further response to determining the predetermined instruction is being processed and the first address does not match the second address, the method further comprises processing an instruction following the predetermined instruction in program order without processing the instrumentation code.

12. The method as recited in claim 10, further comprising updating the second address with a new address that identifies a new location of the plurality of locations.

13. The method as recited in claim 10, wherein foregoing processing of instructions following the predetermined instruction and processing the instrumentation code further comprises
    transferring control flow from the computer program to the instrumentation code.

14. The method as recited in claim 10, wherein in response to detecting execution of the instrumentation code has completed, the method further comprises:
    updating the second address with a new address that identifies a random location of the plurality of locations; and
    transferring control flow from the instrumentation code to instructions following the predetermined instruction in the computer program.

15. The method as recited in claim 10, further comprising:
    initializing a watchpoint data register to store a threshold data value; and
    initializing a first data value stored in the given location identified by the first address to store a random number between zero and the threshold data value.

16. The method as recited in claim 15, further comprising:
    comparing the threshold data value to the first data value responsive to determining the first address matches the second address; and
    foregoing processing of instructions following the predetermined instruction and process the instrumentation code in further response to determining the first data value matches the threshold data value.

17. A non-transitory computer readable storage medium storing program instructions, wherein the program instructions are executable to:
  process instructions of a computer program stored in a memory;
  allocate in the memory a memory region comprising a plurality of locations;
  store a first address in a watchpoint address register, wherein the first address identifies a given location of the plurality of locations;
  initialize a pointer with a second address that identifies a random location of the plurality of locations; and
  responsive to determining a predetermined instruction is being processed:
    compare the first address to the second address; and
    forego processing of instructions following the predetermined instruction and process instrumentation code, in response to determining the first address matches the second address.

18. The non-transitory computer readable storage medium as recited in claim 17, wherein in further response to determining the predetermined instruction is being processed and the first address does not match the second address, the program instructions are further executable to process an instruction following the predetermined instruction in program order without processing the instrumentation code.

19. The non-transitory computer readable storage medium as recited in claim 18, wherein the program instructions are further executable to:
  initialize a watchpoint data register to store a threshold data value; and
  initialize a first data value stored in the given location identified by the first address to store a random number between zero and the threshold data value.

20. The non-transitory computer readable storage medium as recited in claim 19, wherein the program instructions are further executable to:
  compare the threshold data value to the first data value responsive to determining the first address matches the second address; and
  forego processing of instructions following the predetermined instruction and process the instrumentation code in further response to determining the first data value matches the threshold data value.

* * * * *